United States Patent [19]

Illy

[11] 4,254,694
[45] Mar. 10, 1981

[54] COFFEE MACHINE

[76] Inventor: Ernesto Illy, 8, via V. Locchi, Trieste, Italy

[21] Appl. No.: 42,856

[22] Filed: May 29, 1979

[30] Foreign Application Priority Data

Jun. 8, 1978 [IT] Italy .............................. 22072/78[U]
Jun. 8, 1978 [IT] Italy .............................. 24322 A/78

[51] Int. Cl.³ ............................................. A47J 31/24
[52] U.S. Cl. ........................................ 99/295; 99/323
[58] Field of Search ................. 99/295, 289 R, 289 T, 99/289 D, 289 P, 298, 300, 302 R, 323; 426/77

[56] References Cited

U.S. PATENT DOCUMENTS

| | | | |
|---|---|---|---|
| 3,086,447 | 4/1963 | Arnett | 99/295 |
| 3,320,073 | 5/1967 | Bixby | 99/295 |
| 3,327,613 | 6/1967 | Davis | 99/282 |
| 3,345,935 | 10/1967 | Waline | 99/295 |
| 3,370,523 | 2/1968 | Wright | 99/282 |
| 3,450,024 | 6/1969 | Martin | 99/295 |

Primary Examiner—Robert W. Jenkins
Attorney, Agent, or Firm—Karl H. Gross

[57] ABSTRACT

A coffee machine has an assembly provided with a chamber for receiving a permanent filter selected, according to the taste preference of a user, from a set of such filters which each offer different flow resistance to water per unit time. A pod of ground compressed coffee is also removably receivable in the chamber; the characteristics of pod and filter are so selected that during each operation of the machine between 22–26% of the total aromatic substances present in the coffee in the pod, are extracted by hot water flowing through the pod. However, due to the different flow resistance offered by different filters, the quantity of beverage produced during a predetermined operating time will vary. In dependence upon the particular selected filter, the extracted aromatic substances will therefore be more or less diluted in the beverage, to suit a particular taste.

10 Claims, 4 Drawing Figures

4,254,694

COFFEE MACHINE

BACKGROUND OF THE INVENTION

1. Field of the Invention

This invention relates to an improved coffee machine and coffee-brewing system.

More particularly, the invention relates to an improved coffee machine and coffee-brewing system utilizing pods of compressed ground coffee.

Still more specifically, the invention relates to a coffee machine and coffee brewing system wherein the cooperation of special structural features of the machine with prescribed characteristics of the respective coffee pods results in a coffee beverage of unvarying quality.

2. The Prior Art

Coffee machines are known in a wide variety of types and work according to various operating principles. The present invention is concerned with machines wherein hot water is caused to pass through ground coffee, and in particular the type wherein the water passes through a water-permeable pod of ground coffee (tea-bag like, but compacted under pressure).

Coffee machines of the type using such pods (hereinafter called "pod" for simplicity) are known from e.g. U.S. Pat. Nos. 3,327,613 and 3,370,523. What is not known from the prior art is a machine wherein the characteristics of the coffee extracting chamber housing the pod during brewing (hereinafter called "the extracting chamber") are coordinated with specified characteristics of the pods themselves and of the coffee filter through which the beverage must pass.

The only relationship between these aspects, which is known from the prior art, is an empirical one. As a direct consequence of this the coffee beverage brewed with the prior-art machines,—even though their mechanical operation be satisfactory—will vary in taste and wholesomeness from brewing to brewing. In other words: the brewing results are not reliably reproducible and therefore not satisfactory.

SUMMARY OF THE INVENTION

Accordingly, it is an object of the invention to overcome the prior-art disadvantages.

A more particular object is to provide an improved coffee machine and coffee brewing system, wherein the disadvantages inherent in the prior art are avoided.

Still more particularly, it is an object of the invention to provide a coffee machine and brewing system wherein at least substantially uniform extraction of aromatics from the coffee—and hence at least substantially unvarying quality of the brewed beverage—are assured.

Pursuant to these objects, and still others which will become apparent hereafter as the description proceeds, one aspect of the invention resides in a coffee brewing machine of the type using standardized water-permeable pods of 35–50 mm diameter and a thickness equal to at least 5 mm and containing a quantity of 5–10 grams of ground coffee having at least in part a particle size smaller than 0.4 mm and which has been compressed under a pressure of at least 15 atmospheres to impart the required permanent compaction.

Briefly stated, such a machine may comprise wall means defining a brewing chamber; a plurality of permanent filter elements of different permeability and each being individually receivable in the brewing chamber to subdivide the same into a first compartment and a second compartment having an outlet; means for sealingly clamping circumferential edge portions of a pod located in the first compartment so that the pod is held freely suspended therein out of contact with the wall means and filter element so as to be able to swell without interference; and means for admitting a predetermined amount of pressurized hot water per unit time into the first compartment for passage through the pod and filter element therein within a predetermined time span whereby a brewed beverage is produced whose volumetric quantity, and thus strength, is dependent upon the chosen filter element in the chamber and which contains between about 22–26% of the total extractable aromatic substance in the pod due to the standardized nature of the pods.

The novel features which are considered as characteristic for the invention are set forth in the appended claims. Both the construction and method of operation of the invention, as well as additional objects and advantages thereof will however be best understood from the following description of specific embodiments in connection with the accompanying drawings.

DESCRIPTION OF PREFERRED EMBODIMENTS

Figure 1:
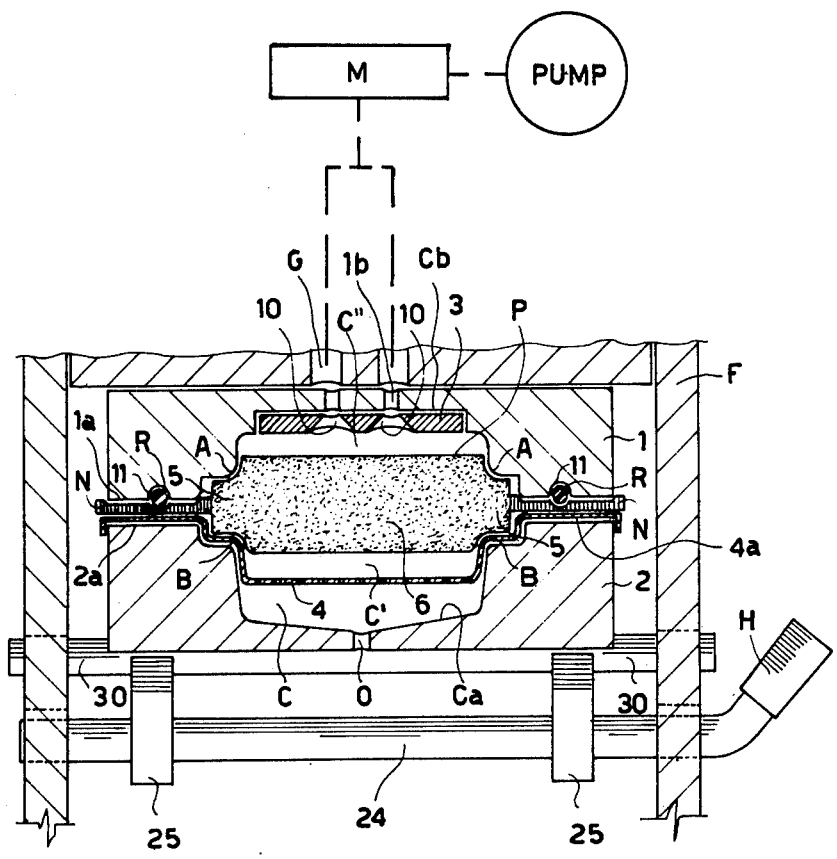
FIG. 1 is a somewhat diagrammatic fragmentary, vertical section through a coffee machine embodying the invention.

Turning firstly to a description of FIG. 1, it will be noted that only those parts of a coffee brewing apparatus are illustrated which are needed for an understanding of the invention. The non-illustrated parts are known per se; nevertheless, some of the major known components have been shown diagrammatically for purposes of orientation.

With this in mind, FIG. 1 will be noted to illustrate two cupped members 1 and 2; member 1 is secured in any known manner to the frame or housing F of the coffee maker and the two members together bound the illustrated extraction chamber C. A plurality (two or more) permanent filters 4 are provided (see FIG. 3) which are interchangeably usable in the machine. These filters 4 may be of synthetic plastic or metallic material and may (but need not) be of circular outline. They each have a flange 4a which is receivable between the juxtaposed circumferential edge faces 1a, 2a of the members 1 and 2, so as to hold each filter 4 in the chamber C out of contact with the bottom wall Ca which is provided with a beverage outlet O.

The members 1 and 2 are further provided with circumferentially extending shoulders A and B respectively, which are so positioned as to clamp a coffee pod P between them, by engaging its periphery 5. It should be noted that FIG. 1 does not show these elements in actual engagement, to permit clearer illustration. The pod P, to be discussed later, contains a charge or quantity 6 of ground coffee which is covered by the usual filter material (e.g. paper) as used, for instance, in tea bags.

It is important that the members 1, 2, their shoulders A, B and the permanent filters 4 be so shaped and dimensioned that the pod P is out of contact with all surrounding surfaces (except at periphery 5), thus subdividing the space between filter 4 and top wall Cb of chamber C into a lower compartment C' and an upper compartment C". This is necessary to permit proper flow of hot water to and through the pod P and to permit the pod P to swell (expand in thickness) as the compressed coffee particles of the charge 6 swell and move apart in response to contact with the hot water. Without this, the water could not quickly and adequately penetrate and wet the charge 6 at the less dense pod center portion.

Water is directed in high-speed jets against the pod P thorugh divergent nozzle openings 10 in a plate or baffle 3 which is mounted on upper wall Cb. These communicate with holes 1b in member 1, which in turn communicates with guide channels G receiving hot water under a pressure of about 6 atmospheres via heating means M and the diagrammatically shown water pump (both known per se).

The member 2 is removable to permit installation of a selected filter 4 from the set of two or more, and of new pods P. Any means known per se may be used to mount it removably in the coffee maker. By way of non-limiting example a clamping device is illustrated, having a handle H connected to or of one piece with a bar 24 on which two cams 25 are mounted. Turning the handle H rotates bar 24 and therefore the cams 25 which are eccentric thereon. They push against a vertically movable bar 30 guided in slots (not shown) of the frame F. Bar 30 is fixed to and moves with member 2. Therefore, when bar 30 is pushed up, member 2 is pushed towards member 1 and cooperates therewith to clamp filter 4 and pod P in place. A circular groove formed in surface 1a of member 1 surrounds the chamber C and receives a sealing ring (e.g. O-ring) R of elastically yieldable material. This ring, cooperating with a peripheral portion N of pod P, assures a complete seal against the escape of liquid between the surfaces 1a, 2a.

The filters 4 may have different apertured surface areas (within the limits permitted by the chamber C) and have different numbers of apertures per unit surface area. For example, the filter in FIG. 3A may have an apertured surface of a diameter of about 30–35 mm and provided per square centimeter of surface area with 36 holes each having a diameter between 0.20–0.35 mm. The filter in FIG. 3B may have an apertured surface of a diameter of about 35–40 mm and provided per square centimeter with 36 holes each having a diameter between 0.20–0.35 mm. Other surface diameters, number of holes and/or hole diameter may also be chosen, so long as the goals of the invention are achieved when the respective filter is used in conjunction with a specified pod P, as still to be discussed. Since the filters 4 are to be permanent it is currently preferred that they be not less than about 0.6 mm thick.

Figure 2:
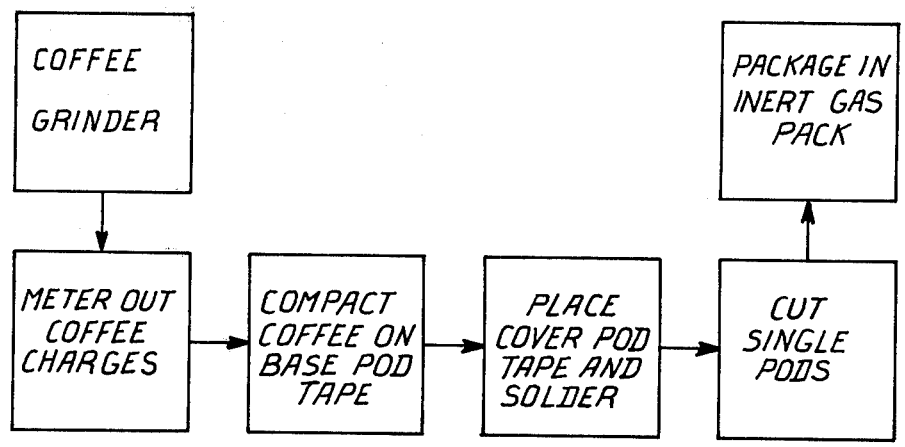
FIG. 2 is a flow diagram, illustrating the steps involved in producing coffee pods suitable for use with the apparatus of FIG. 1.

The assembly thus far described cannot by itself achieve the purposes of the invention. It must be used in conjunction with a standardized (the word is used to denote a constant level of quality) coffee pod P. Such pods are already known, e.g. from the two aforementioned U.S. patents. Merely for convenience, the flow diagram in FIG. 2 recapitulates the basic manufacturing steps involved in making the pods; it is self-explanatory in conjunction with the following.

The quality of a coffee beverage depends in large measure upon the proper extraction ratio of the aromatic substances contained in coffee. Too small a ratio will make the coffee beverage taste too insipid; too large a ratio will make it taste too strong and/or bitter. The extraction ratio, i.e. the percentage of aromatic substances extracted from the total amount of such substances in a quantity of ground coffee, in turn depends upon the time required for the water to pass through the ground coffee. If a pod of ground coffee is used, as in the present invention, the rate of water passage through the pod depends upon the velocity of the water and on the flow resistance offered to the water by the coffee. This depnds mainly upon the thickness and porosity of the pod. Added to this resistance, incidentally, is the flow resistance of the filter 4 which is a function of the filter shape, its proximity to the pod and the combined surface area of the apertures in the filter.

The problem is that one cannot brew coffee of consistently good (reproducible) quality, unless one knows both the flow resistance of the quantity of coffee (i.e. in the present invention the pod of coffee) and of the filter. In applicant's machine the combination of extraction chamber and filter can take maximum advantage of the coffee contents of the pod—if all pods are alike (quality controlled) and have like flow-through resistance.

Accordingly, a further aspect of the invention is to provide for use in the inventive machine a standard coffee pod wherein the important characteristics are kept constant; namely quantity of coffee, quality of coffee, degree of compaction, granulometry and humidity of the coffee. Of course, quality and humidity are aspects which will be controlled by any good manufacturer as a matter of standardization so that they can be taken for granted in a standardized pod. The pod is composed of a water-permeable envelope (of e.g. filter paper) and is to contain about 5 to 10 grams of ground coffee which is finely ground (i.e. at least 75% of the coffee particles have a diameter smaller than 0.4 mm and 20–55% of the coffee particles have a diameter smaller than 0.1 mm). The coffee is to be compacted at a pressure not substantially less than 15 atmospheres and the finished pod is to have a thickness of 5 mm or somewhat more (up to about 13 mm). Its diameter is to be about 35–50 mm.

This pod is the pod P which is to be used with the inventive machine, irrespective of the taste preference of the particular coffee drinker. Adjustments for taste preferences are made by changing filters 4.

Figure 3A:
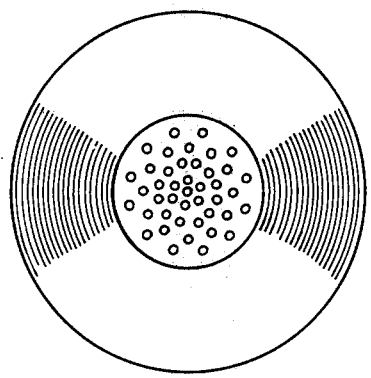
FIGS. 3A and 3B are plan views of different filters for use in the inventive apparatus.

For example, when the pod P is used with the filter in FIG. 3A, having a surface diameter of 30–35 mm, the hot water (the pump supplies the hot water and the water flow is determined by the overhall resistance of the associated pod and filter) passes through the pod P and filter 4 and 20 to 40 seconds and during this time extracts 22–26% of the aromatic coffee substances, producing a beverage volume of 30–50 cm$^3$. This is an "espresso" coffee appealing to the Italian taste. If, by faulty manufacturing, the pod resistance is over the required one, a known timer device shuts off the pump at the upper time limit.

Figure 3B:
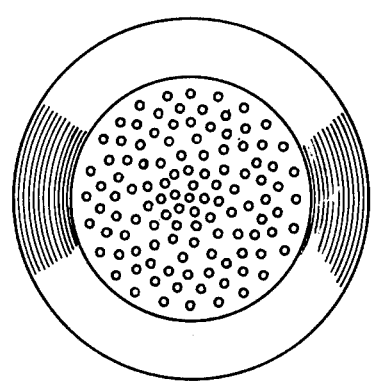

If, however, the same pod P is used with filter of FIG. 3B having a surface diameter of 35–40 mm, the water flow-through time and extraction ratio of aromatic substances will remain the same as before, but the beverage volume will be between 50–120 cm$^3$ and the taste of the beverage will be such as to appeal to North American preferences since the aromatic substances will be more diluted.

Methods and equipment for making the pods P are, of course, known per se as evidenced by the aforementioned U.S. patents. To produce the pod P which is suitable for use in applicant's coffee maker it is merely necessary to maintain the degree of compaction, thickness of the overall pod, and pod diameter at the specified values.

The invention is susceptible of various modifications which are intended to be encompassed within the scope of the appended claims. For example, the filters and pod need not be round but could be square, rectangular, or of other shapes. Also, filters other than those specified herein above may be used, provided only that, if associated in the machine with a pod having the aforementioned characteristics, they make it possible to brew—within the specified time—coffee beverage containing the specified ratio of extracted aromatic substances but differing in beverage volume from those mentioned above.

While the invention has been illustrated and described as embodied in a coffee maker, it is not intended to be limited to the details shown, since modifications and structural changes may be made without departing from the spirit of the invention.

What is claimed as new and desired to be protected by Letters Patent is set forth in the appended claims:

1. In a coffee brewing machine of the type using standardized water-permeable pods of 35–50 mm diameter and a thickness equal to 5–13 mm and containing a quantity of 5–10 grams of ground coffee having at least 45% of the coffee particles of diameter smaller than 0.4 mm and 20–55% of the coffee particles of diameter smaller than 0.1 mm which has been compressed under a pressure of at least 15 atmospheres, a combination comprising
    wall means defining a brewing chamber;
    a plurality of permanent filter elements of different permeability and each being individually receivable in said brewing chamber to subdivide the same into a first compartment and a second compartment having an outlet;
    means for sealingly clamping circumferential edge portions of a pod located in said first compartment so that the pod is held freely suspended therein out of contact with said wall means and filter element so as to be able to swell without interference; and
    means for admitting a predetermined amount of pressurized hot water per unit time into said first compartment for passage through said pod and filter element therein within a predetermined time span whereby a brewed beverage is produced whose volumetric quantity, and thus strength, is dependent upon the chosen filter element in said chamber and which contains between 22–26% of the total extractable aromatic substances in the pod.

2. A combination as defined in claim 1, wherein the filter elements are of sheet material having a thickness of at least 0.6 mm.

3. A combination as defined in claim 1, wherein one of said filter elements has a surface of a diameter between 30–35 mm which is provided per square centimeter of surface area with 36 holes having a diameter within the range of 0.20–0.35 mm and wherein the volumetric quantity of beverage brewed by said machine is between 30–50 cm$^3$ when said one filter element is received in said chamber.

4. A combination as defined in claim 1, wherein one of said filter elements has a surface of a diameter between 35–40 mm which is provided per square centimeter of surface area with 36 holes having a diameter within the range of 0.20–0.35 mm, and wherein the volumetric quantity of beverage brewed by said machine is between 50–120 cm$^3$ when said one filter element is received in said chamber.

5. A combination as defined in claim 1, wherein said wall means comprises two cupped members which together bound said chamber; and further comprising connecting means for detachably connecting said members to one another.

6. A combination as defined in claim 5, wherein said admitting means comprises at least one inlet aperture provided in one of said members and communicating with said first compartment.

7. A combination as defined in claim 6, wherein said admitting means further comprises a baffle element adjacent an inward end of the said inlet aperture and provided with a plurality of holes communicating with said inlet aperture to receive hot water therefrom and diverging in direction towards a pod clamped by said clamping means so as to discharge the water against the pod in form of a plurality of jets.

8. A coffee-brewing system, comprising
    a water-permable pod having a thickness equal to 5–13 mm and a diameter of 35–50 mm, said pod containing a quantity of 5–10 grams of ground coffee havng at least 75% of the coffee particles of diameter smaller than 0.4 mm and 20–55% of the coffee particles of diameter smaller than 0.1 mm and which has been compressed under a pressure of at least 15 atmospheres; and
    means for brewing a coffee beverage from the coffee in said pod, said means comprising an assembly having a brewing chamber, a plurality of filter elements of different permeability and each being individually receivable in said chamber to subdivide the same into a first and a second compartment having an outlet for the finished beverage, means for mounting said pod in said first compartment so as to be out of contact with surfaces bounding said first compartment, and means for admitting a predetermined amount of pressurized hot water per unit time into said first compartment for passage through said pod and filter element into said second compartment within a predetermined time space.

9. A coffee brewing system as defined in claim 8, wherein one of said filter elements has a surface of a diameter between 30–35 mm which is provided per square centimeter of surface area with 36 holes having a diameter within the range of 0.20–0.35 mm and wherein the volumetric quantity of beverage brewed by said system is between 30–50 cm$^3$ when said one filter element is received in said chamber.

10. A coffee brewing system as defined in claim 8, wherein one of said filter elements has a surface of a diameter between 35–40 mm which is provided per square centimeter of surface area with 36 holes having a diameter within the range of 0.20–0.35 mm, and wherein the volumetric quantity of beverage brewed by said system is between 50–120 cm$^3$ when said one filter element is received in said chamber.

* * * * *